US008326837B2

(12) United States Patent
Brown et al.

(10) Patent No.: US 8,326,837 B2
(45) Date of Patent: Dec. 4, 2012

(54) DYNAMICALLY GENERATING A PORTAL SITE MAP

(75) Inventors: Douglas Stuart Brown, Charlotte, NC (US); James Robert Rudd, Charlotte, NC (US); Robert J. Torres, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 12/058,535

(22) Filed: Mar. 28, 2008

(65) Prior Publication Data

US 2008/0183720 A1 Jul. 31, 2008

Related U.S. Application Data

(63) Continuation of application No. 11/260,566, filed on Oct. 27, 2005, now abandoned.

(51) Int. Cl.
*G06F 7/00* (2006.01)
(52) U.S. Cl. .................................. 707/741; 707/797
(58) Field of Classification Search .................. 707/694, 707/741, 707, 797, 803
See application file for complete search history.

(56) References Cited

U.S. PATENT DOCUMENTS

| | | | |
|---|---|---|---|
| 5,870,559 A | 2/1999 | Leshem et al. | 709/224 |
| 6,144,962 A | 11/2000 | Weinberg et al. | 707/10 |
| 6,668,353 B1 | 12/2003 | Yurkovic | 715/205 |
| 6,691,163 B1 | 2/2004 | Tufts | 709/224 |
| 6,868,525 B1 | 3/2005 | Szabo | 715/738 |
| 6,871,197 B1 | 3/2005 | Johnson | |
| 7,296,222 B1 | 11/2007 | Sakairi | 715/234 |
| 7,469,255 B2 * | 12/2008 | Kusterer et al. | 707/102 |
| 2002/0010715 A1 * | 1/2002 | Chinn et al. | 707/514 |
| 2002/0023073 A1 * | 2/2002 | Stern et al. | 707/1 |
| 2002/0169852 A1 | 11/2002 | Schaeck | |
| 2004/0039550 A1 | 2/2004 | Myers | 702/186 |
| 2004/0068498 A1 * | 4/2004 | Patchet et al. | 707/6 |
| 2004/0098451 A1 | 5/2004 | Mayo | |
| 2004/0133660 A1 * | 7/2004 | Junghuber et al. | 709/219 |
| 2004/0243928 A1 | 12/2004 | Hesmer et al. | |
| 2005/0223310 A1 * | 10/2005 | Wachholz-Prill et al. | 715/501.1 |
| 2006/0117055 A1 | 6/2006 | Doyle | 707/102 |
| 2006/0190448 A1 | 8/2006 | Bartek et al. | 707/5 |

(Continued)

OTHER PUBLICATIONS

Applicant's attorney, Preliminary Amendment of U.S. Appl. No. 11/260,566 (Assignee's abandoned, parent application), Mar. 28, 2008, Austin, TX, USA.

(Continued)

*Primary Examiner* — Amy Ng
(74) *Attorney, Agent, or Firm* — Garg Law Firm, PLLC; Rakesh Garg; Mark C. Vallone (57) ABSTRACT

Embodiments for dynamically generating a portal site map may include determining a root node of a navigational construct of a portal site, where the root node has one or more child nodes. Embodiments may further include recursively crawling through the one or more child nodes of the root node to discover a composition subtree for at least one of the child nodes, the composition subtree comprising information relating to one or more portlets associated with at least one of the child nodes. Embodiments may further include generating a portal site map having an indication of the one or more child nodes and an indication of the one or more portlets associated with at least one of the child nodes. Further embodiments may include generating a portlet response based on the generated portal site map.

20 Claims, 7 Drawing Sheets

U.S. PATENT DOCUMENTS

| | | | |
|---|---|---|---|
| 2007/0006069 A1* | 1/2007 | Smith et al. | 715/513 |
| 2007/0022110 A1 | 1/2007 | Suda et al. | 707/5 |
| 2007/0050338 A1 | 3/2007 | Strohm et al. | 707/3 |
| 2007/0214449 A1 | 9/2007 | Choi et al. | 717/100 |
| 2007/0233871 A1 | 10/2007 | Fletcher et al. | 709/226 |
| 2007/0239746 A1 | 10/2007 | Masselle et al. | 707/101 |
| 2007/0244846 A1 | 10/2007 | Jolley et al. | 706/48 |
| 2008/0010142 A1 | 1/2008 | O'Brien et al. | 705/14 |
| 2008/0109472 A1 | 5/2008 | Underwood et al. | 707/102 |

OTHER PUBLICATIONS

Non-Final Office Action of U.S. Appl. No. 11/260,566 (Assignee's abandoned, parent application), Sep. 16, 2008, USPTO, Alexandria, VA, USA.

Microsoft Computer Dictionary, Editors: Alex Blanton and Sandra Haynes, 2002, Microsoft Press, Fifth Edition, p. 413.

Applicant's attorney, Response to Non-Final Office Action of U.S. Appl. No. 11/260,566 (Assignee's abandoned, parent application), Dec. 16, 2008, Austin, TX, USA.

Interview Summary of U.S. Appl. No. 11/260,566 (Assignee's abandoned, parent application), Dec. 24, 2008, USPTO, Alexandria, VA, USA.

Final Office Action of U.S. Appl. No. 11/260,566 (Assignee's abandoned, parent application), Feb. 23, 2009, USPTO, Alexandria, VA, USA.

Notice of Abandonment of U.S. Appl. No. 11/260,566 (Assignee's abandoned, parent application), Sep. 24, 2009, USPTO, Alexandria, VA, USA.

* cited by examiner

DYNAMICALLY GENERATING A PORTAL SITE MAP

CROSS-REFERENCES TO RELATED APPLICATIONS

Pursuant to 35 USC §120, this continuation application claims priority to and benefit of U.S. patent application Ser. No. 11/260,566, entitled "SYSTEMS, METHODS, AND MEDIA FOR GENERATING A PORTAL SITE MAP", filed on Oct. 27, 2005, the disclosure of which is incorporated herein in its entirety for all purposes.

FIELD OF INVENTION

The present invention is in the field of data processing systems and, in particular, to systems, methods and media for dynamically generating a site map for a portal site, including a site map containing portlets of the portal site.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM or DVD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. The use of mobile computing devices, such as notebook PCs, personal digital assistants (PDAs), sophisticated wireless phones, etc., has also become widespread. Mobile computing devices typically exchange some functionality or performance when compared to traditional PCs in exchange for smaller size, portable power, and mobility.

Networks such as the Internet and corporate intranets provide a mechanism for users to transfer data among computers for information sharing, workplace collaboration, data collection, etc. Users gain access to networks such as the Internet by accessing a web server via personal Internet service providers (ISP's), broadband network connections, or high speed network connections through office systems. Typically, a user will view Internet or intranet content using a graphic browser application such as Microsoft Corporation's Internet Explorer™, Netscape Communication Corporation's Navigator™, Mozilla Foundation's Mozilla, Apple Corporation's Safari™, etc. Browsers, at their most basic level of operation, permit users to connect to a given network site, download informational content from that site, and display that information to the user. To view additional information, the user designates a new network address (such as by selecting a link) whose contents then replace the previously displayed information on the user's computer display.

As the amount of information available to users continues to dramatically increase, portal sites (known also as portals) have become more and more popular for aggregating and displaying information to users. Portals are an entry point or gateway for access to other web sites and information and provide a single point of access to a wide variety of content, data, knowledge, and services throughout an enterprise or network. As such, they have become increasingly popular with users as a stalling point (often designated as their "home page", the first page displayed when they start their browser) for their use of a network. Publicly accessible Internet portals include Yahoo! Corporation's My Yahoo!®, Microsoft Corporation's MSN®, Google Corporation's Google™ News, etc. Private portals, including Time Warner Inc.'s America On-line (AOL®) service, are also popular. Many large companies also provide portals on their corporate intranet for use by all of their employees or groups of employees. Portal software may include International Business Machines Corp.'s (IBM®'s) WebSphere® integration and application infrastructure software or other software.

Portals allow a user to view content or links to multiple other sites (at different network addresses) simultaneously on one display, rather than forcing users to only view content from one site at a time. An Internet portal could, for example, simultaneously provide users with content from a news service, weather service, sports score service, etc., with each service potentially being provided by a different network site. If the user desired more information from any of those services, the user could select the link to that service and the portal would facilitate the connection between the user and the other site. Each application or module of a portal is often called a portlet, which is a reusable web component that displays relevant information to portal users. Portal users may typically modify the particular portlets displayed on a portal as well as their location or configuration.

Often when navigating a web site such as a portal, a user may get 'lost' and be unable to find the content or functionality for which they are looking. On relatively static sites, one common strategy for addressing the problem of the lost user is the addition of a site map to the web site. A site map is a high-level visual representation of the organization of the web site's content. Site maps can be a very effective usability enhancement, but their usefulness decreases dramatically when the site organization is no longer static, as the site map may not reflect recent changes or differences between users. A portal allows the location of content and functionality of a web site to be dynamic based on end user customization through the use of portlets. With portal technology, a static site map created by the web developer no longer has meaning as any portlet customization by the end user automatically creates a new site organization, which in turn results in new site navigation. As a result, any user-initiated customization of portals or portals renders the site map invalid.

One solution to this problem is to use IBM®'s WebSphere® Portal Server software to generate a dynamic site map to the page level. Such a solution, however, does not identify portlets contained on the portal pages, making it impossible for the user to find portlets or links to functionality contained within a portlet. Another solution to the problem would be for a help desk provider to interrogate and navigate an end user's machine (with installed help desk software) to find content or functionality for the user. This solution, however, is highly invasive and labor-intensive, There is, therefore, a need for an effective mechanism for dynamically generating a site map for a portal, including any portlets. There is an even greater need for such a system when users modify the selected portlets or their location.

SUMMARY OF THE INVENTION

The problems identified above are in large part addressed by systems, methods and media for dynamically generating a portal sitemap, including portlets of the portal site map, are disclosed. Embodiments may include determining a root node of a navigational construct of a portal site, where the root node has one or more child nodes. Embodiments may further include recursively crawling through the one or more child nodes of the root node to discover a composition subtree for at least one of the child nodes, the composition subtree comprising information relating to one or more portlets associated with at least one of the child nodes. Embodiments may further include generating a portal site map having an indication of the one or more child nodes and an indication of the one or more portlets associated with at least one of the child nodes. Further embodiments may include generating a portlet response based on the generated portal site map.

Another embodiment provides a machine-accessible medium containing instructions effective, when executing in a data processing system, to cause the system to perform a series of operations for dynamically generating a portal site map. The series of operations generally includes determining a root node of a navigational construct of a portal site, where the root node has one or more child nodes. The series of operations may further include recursively crawling through the one or more child nodes of the root node to discover a composition subtree for at least one of the child nodes, the composition subtree comprising information relating to one or more portlets associated with at least one of the child nodes. The series of operations may further include generating a portal site map having an indication of the one or more child nodes and an indication of the one or more portlets associated with at least one of the child nodes. In a further embodiment, the series of operations includes generating a portlet response based on the generated portal site map.

A further embodiment provides a portal site mapping system. The portal site mapping system may generally include a communications module in communication with a client computer system via a network and a portal page aggregator to aggregate content from one or more portlets to generate a portal response for transmission to the client computer system. The portal site mapping system may further include a dynamic site map portlet in communication with the portal page aggregator to dynamically generate a portal site map, where the portal site map includes information relating to one or more portlets.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover ail modifications, equivalents, and alternatives falling within the spirit and scope of the present invention as defined by the appended claims. The descriptions below are designed to make such embodiments obvious to a person of ordinary skill in the art.

Generally speaking, systems, methods and media for dynamically generating a portal site map, including portlets of the portal site map, are disclosed. Embodiments may include determining a root node of a navigational construct of a portal site, where the root node has one or more child nodes. Embodiments may further include recursively crawling through the one or more child nodes of the root node to discover a composition subtree for at least one of the child nodes, the composition subtree comprising information relating to one or more portlets associated with at least one of the child nodes. Embodiments may further include generating a portal site map having an indication of the one or more child nodes and an indication of the one or more portlets associated with at least one of the child nodes. Further embodiments may include generating a portlet response based on the generated portal site map.

The system and methodology of the disclosed embodiments provides for an effective and efficient way of generating a portal site map. By dynamically interrogating the nodes of a portal, the disclosed system may generate a portal site map that includes each page of a portal site as well as the portlets on each page. Portal users may use the generated portal site map to orient themselves within the portal, find content with which they were not familiar, or to navigate the portal site. The dynamic nature of the disclosed system provides an up-to-date portal site map that is advantageously independent of user-initiated customization or selection of portlets.

While specific embodiments will be described below with reference to particular configurations of hardware and/or software, those of skill in the art will realize that embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Figure 1:
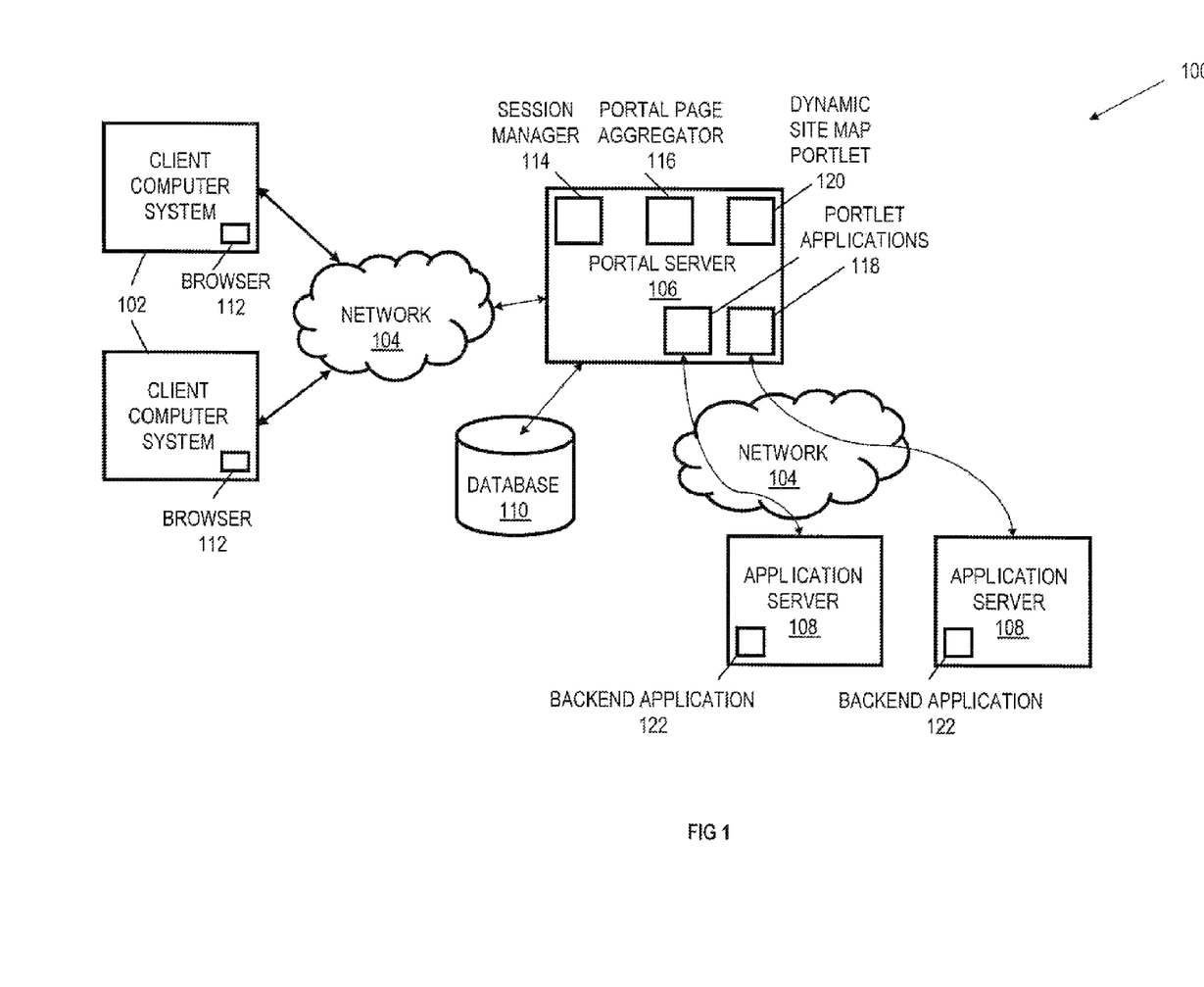
FIG. 1 depicts an environment for a portal site mapping system with a dynamic site map portlet according to one embodiment.

Turning now to the drawings, FIG. 1 depicts an environment for a portal site mapping system with a dynamic site map portlet according to one embodiment. In the depicted embodiment, the portal site mapping system 100 includes a plurality of client computer systems 102 in communication with a portal server 106 via a network 104. Each client computer system 102 may include a browser 112 to allow a user of the client computer system 102 to access and view information on various network sites. The portal server 106, in turn, may be in communication with one or more application servers 108 via network 104. The portal server 106 provides, in one embodiment, a portal site that may be accessed and viewed by the user of a client computer system 102 using browser 112. Portal server 106 includes, in the depicted embodiment, a session manager 114, a portal page aggregator 116, one or more portlet applications 118, and a dynamic site map portlet 120. Each application server 108 may contain one or more backend applications 122 to provide content, information, or services to be displayed on the portal site provided by the portal server 106. Optional database 110 may be in communication with the portal server 106 for storage of generated site maps, content, user preferences, etc.

In the portal site mapping system 100, any of the client computer systems 102, the portal server 106, the application sewers 108, and the database 110 may be located at the same location, such as in the same building or computer lab, or could be remote. While the term "remote" is used with reference to the distance between the components of the portal site mapping system 100, the term is used in the sense of indicating separation of some sort, rather than in the sense of indicating a large physical distance between the systems. For example, any of the components of the portal site mapping system 100 may be physically adjacent or located as part of the same computer system in some network arrangements, such as when the portal server 106 and one or more application servers 108 are part of the same computer system.

Client computer system 102 may include one or more personal computers, workstations, servers, mainframe computers, notebook or laptop computers, desktop computers, PDAs, set-top boxes, mobile phones, wireless devices, or the like. In some embodiments, client computer system 102 may be a computer system as described in relation to FIG. 2. The client computer system 102 may be in wired or wireless communication with network 104. A portal user may utilize a client computer system 102 and its associated browser 112 to facilitate the access and viewing of content, such as a portal page, from the portal server 106. Browser 112 may be a graphical browser application that allows a user to view Internet or intranet content such as Microsoft Corporation's Internet Explorer™, Netscape Communication Corporation's Navigator™, Mozilla Foundation's Mozilla, Apple Corporation's Safari™, etc. Using a browser 112, a user may connect to a given portal site, download content from that site, and view that content (including generated portal site maps as described herein).

Network 104 may be any type of data communications channel, such as the Internet, an intranet, a LAN, a WAN, an Ethernet network, a wireless network, a proprietary network, or a broadband cable network. The Internet or other public network may be particularly useful as network 104 when the client computer systems 102 are accessing a public portal site hosted on portal server 106 as communications between these systems will be facilitated. Similarly, a corporate intranet may serve as network 104 for communications with an internal corporate portal. Those skilled in the art will recognize, however, that the invention described herein may be implemented utilizing any type of data communications channel or combinations of data communication channels.

The portal server 106 provides an interface between the users on the client computer systems 102 and other content, including content located on backend applications 122 and/or application servers 108. The portal server 106 may be one or more of any type of computer system, including servers, personal computers, workstations, mainframe computers, notebook or laptop computer, desktop computers, or the like. In some embodiments, the portal server 106 may be a computer system as described in relation to FIG. 2. An example portal server 106 is an IBM® eServer® server or similar server. In this example, the portal server 106 may include software such as IBM®'s WebSphere® Portal application that provides an integrated portal solution for business-to-employee, business-to-consumer, and business-to-business interactions.

The portal server 106 may contain both content provided by the operator of the portal server 106 as well as content provided by any of the backend applications 122 and/or application servers 108. The content may be displayed to the user via an initial view, or front page, which includes a variety of modules or frames, as well as optional additional portal pages. The format or layout of each page of the portal may be configured by an administrator, based on user preferences, etc. Each module or frame may contain content provided by the portal server 106, an application server 108, a backend application 122, or any combination thereof. The content may include any type of information, applications, databases, services, informational content, e-commerce offerings, advertisements, etc. Some of the modules and frames may be user-selectable, whereas others may be mandatory elements of the portal. A user may access the content by selecting or interacting with the appropriate link from the portal site. For example, a general use Internet portal may contain a news module, a sports module, and a weather module. Each of these modules in this example may contain an indication of content located in a backend application 122 on an application server 108. In this example, a user might see a few headlines in the new module and if they select one of the headlines, the portal server 106 would facilitate acquiring additional content (i.e., the full news story) from the backend application 124 that provides the news module. The customizability of portals, particular customization performed by portal users, makes the disclosed portal site map system particularly useful, as the disclosed system may create a portal site map independent of any customization of a portal site performed by a portal user.

Each application server 108 may include one or more backend applications 122. Backend applications 122 may be any application that may be used to provide services, content, or information to a portal site. Example backend applications 122 include news, sports ticker, weather, ski report, search, television guide, movie times, or any other types of applications. Each application server 108 may be one or more of any type of computer system, including servers, personal computers, workstations, mainframe computers, notebook or laptop computer, desktop computers, or the like. In one embodiment, an application server 108 may be an IBM® eServer® or similar server. Each application server 108 may be operated by the same company (e.g., in a corporate intranet) as the portal server 106, by different companies or providers, etc.

As described previously, the portal server 106 may contain a session manager 114, a portal page aggregator 116, and one or more portlet applications 118. The session manager 114 may manage sessions for a plurality of users of client computer system 102, allowing each portal user to be individually authenticated, customize their portal view, choose portlets, etc. The session manager 114 may manage both the user's session identifier with the portal server 106 and any user sessions with an application server 108. The portal page aggregator 116 may create, aggregate, and/or organize the content to be displayed on a portal page that will ultimately be transmitted and displayed to the portal user. The format or layout of each page of the portal may be configured by an administrator, based on user preferences (via session manager 112), etc. In one embodiment, some content may be displayed in frames on the portal page. Each module or frame may contain content provided by the portal server 106, an application server 108, a backend application 122, or any combination thereof. For example, a frame may contain content from a particular backend application 122 and/or application server 108, such as a news service backend application 122 that provides news to users. In an alternative embodiment, a frame may contain content from multiple sources, such as a frame that contains content from two backend applications 122. The portal page aggregator 116 may create multiple pages to be displayed that may be switched based on the user identity, user permissions or authorizations, actions of the user (e.g., selecting options that result in a new page), user requests for content from a backend application 122, etc.

The one or more portlet applications 118 of the portal server may provide for interaction with the application server 108 in one embodiment. The portlet application 118 may receive communications from the application server 108, such as content that was requested by a user on a client computer system 102. The portlet application 118 may also transmit information to the application server 108, such as requests from the user for content, application session data, etc.

The portal server 106 may also contain a dynamic site map portlet 120. The dynamic site map portlet 120, as described in more detail subsequently, may dynamically generate a portal site map by interrogating the internal structure of a portal and portlet pages. The dynamic site map portlet 120 may find nodes that are composition elements and crawl these composition elements (such as pages, portlets, or links within portlets) for detailed information to create the dynamic site map. The resulting dynamic site map displayed to a user of the portlet may thus advantageously include both portlet pages and information about the portlets within the pages. The dynamic site map portlet 120 also may report any changes in the portlet configuration through the use of dynamic interrogation, providing an up-to-date site map for users of the dynamic site map portlet 120. Because the dynamic site map portlet 120 uses dynamic interrogation, whenever the portal configuration changes (e.g., new portlets or portal pages are added or removed) the dynamic site map portlet 120 will report or reflect those changes. A user may view the portal site map to determine the location of portal content, to discover new content of the portal, or to orient themselves within the portal site.

Figure 2:
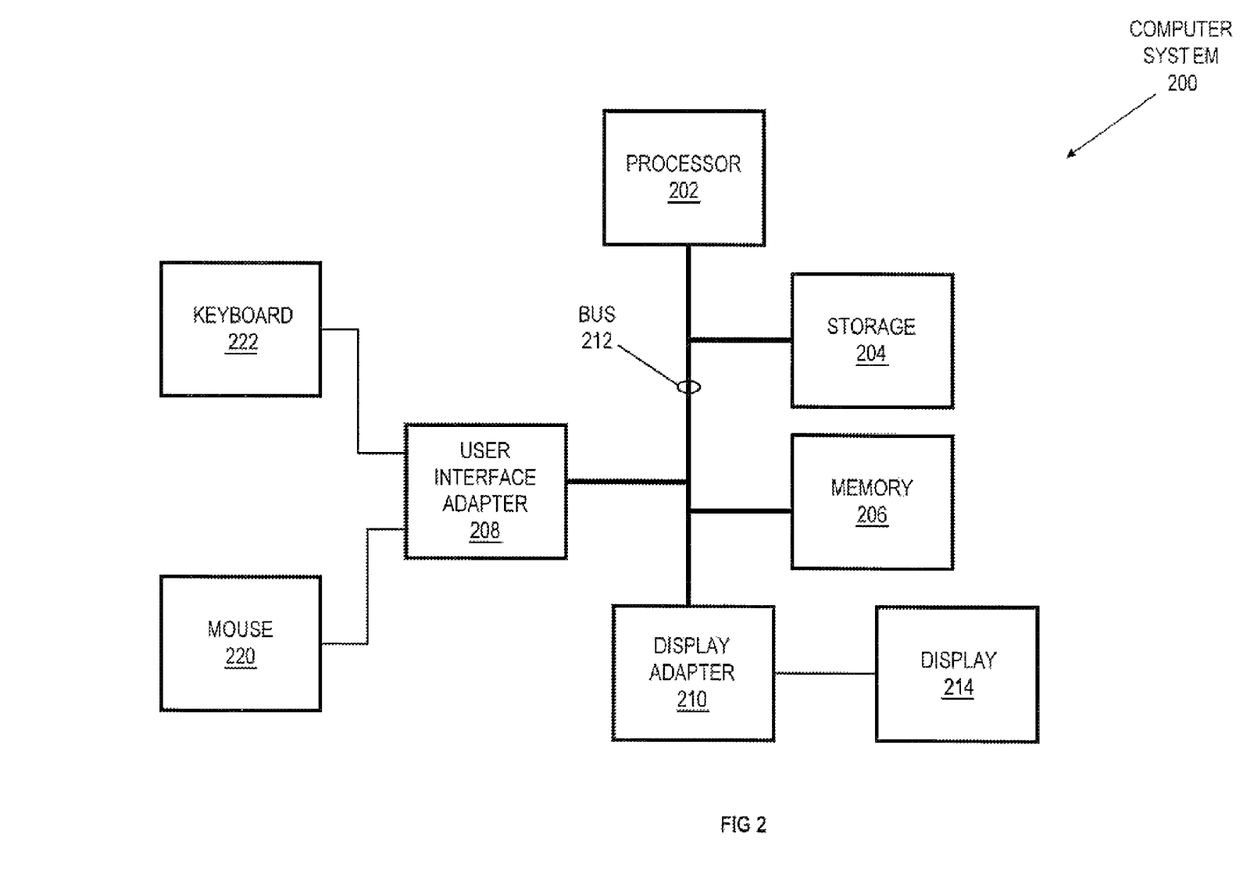
FIG. 2 depicts a block diagram of one embodiment of a computer system suitable for use as a component of the IM system.

FIG. 2 depicts a block diagram of one embodiment of a computer system 200 suitable for use as a component of the portal site mapping system 100, such as a client computer system 102, a portal server 106, or am application server 108. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 214. The bus 214 facilitates communication between the processor 202 and other components of the computer system 200, as well as communication, between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM).

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. The bus 212 may also connect the processor 202 to a display, such as an LCD display or CRT monitor, via the display adapter 210.

Figure 3:
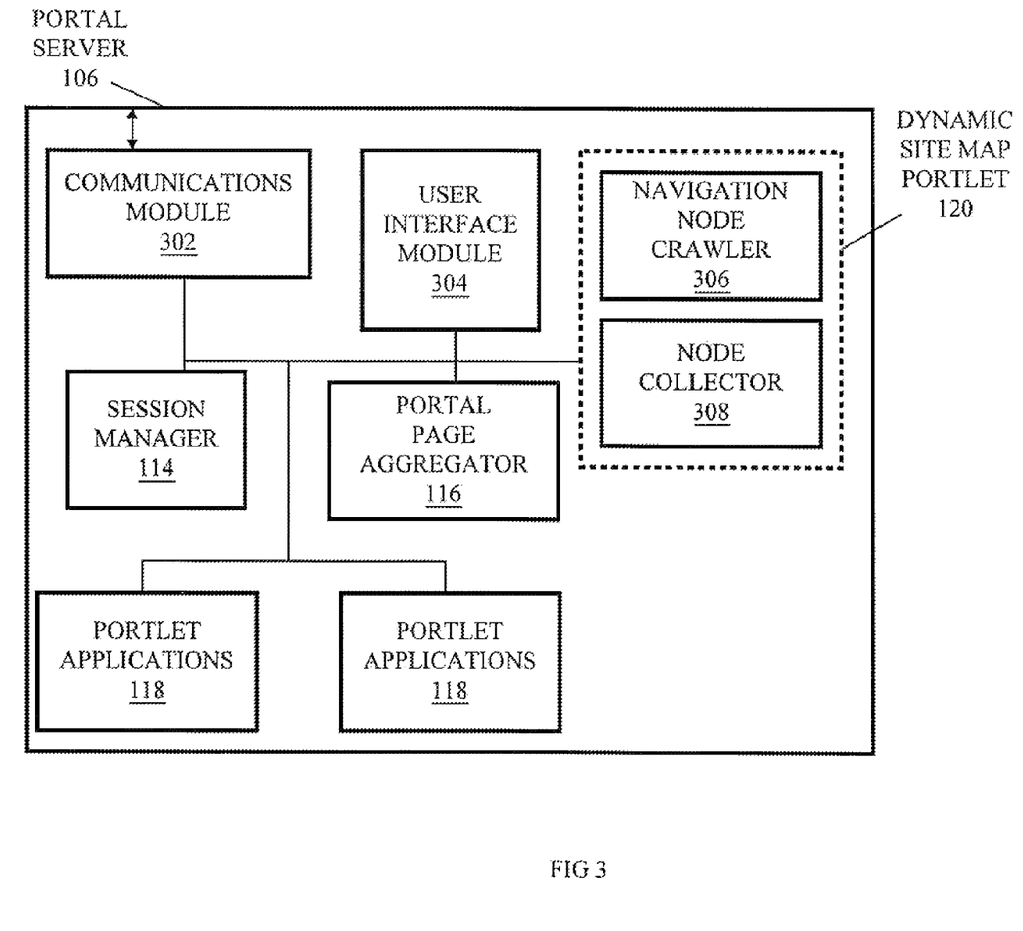
FIG. 3 depicts a conceptual illustration of software components of a portal server with a dynamic site map portlet according to one embodiment.

FIG. 3 depicts a conceptual illustration of software components of a portal server with a dynamic site map portlet according to one embodiment. The portal server 106 of the depicted embodiment includes a session manager 114, a portal page aggregator 116, one or more portlet applications 118, a dynamic site map portlet 120, a communications module 302, and a user interface module 304. The session manager 114, portal page aggregator 116, portlet applications 118, and dynamic site map portlet 120 are described in relation to FIG. 1 and the description will not be repeated for the sake of brevity. The communications module 302 may facilitate communications to and from the portal server 106 via network 104, such as communications with client computer systems 102 or application servers 108. The user interface module 304 may receive user input from user input devices such as a mouse or keyboard and may also provide output to a user, such as via a display or speaker.

The dynamic site map portlet 120 of the disclosed embodiment includes two sub-modules, a navigation node crawler 306 and a node collector 308. As described in more detail in relation to FIGS. 4-6, the navigation node crawler 306 may find all of the nodes in a portal that are composition elements and crawl each for additional information in order to generate a portal site map. The navigation node crawler 306 crawls each page of a portal site to determine information about those pages as well as any portlets associated with those pages. The results of the crawling of the navigation node crawler 306 may be stored in the node collector 308. Generated portlet site maps may also be stored in the node collector 308. In one embodiment, items need only be stored in the node collector 308 until used for a portal site map.

Figure 4:
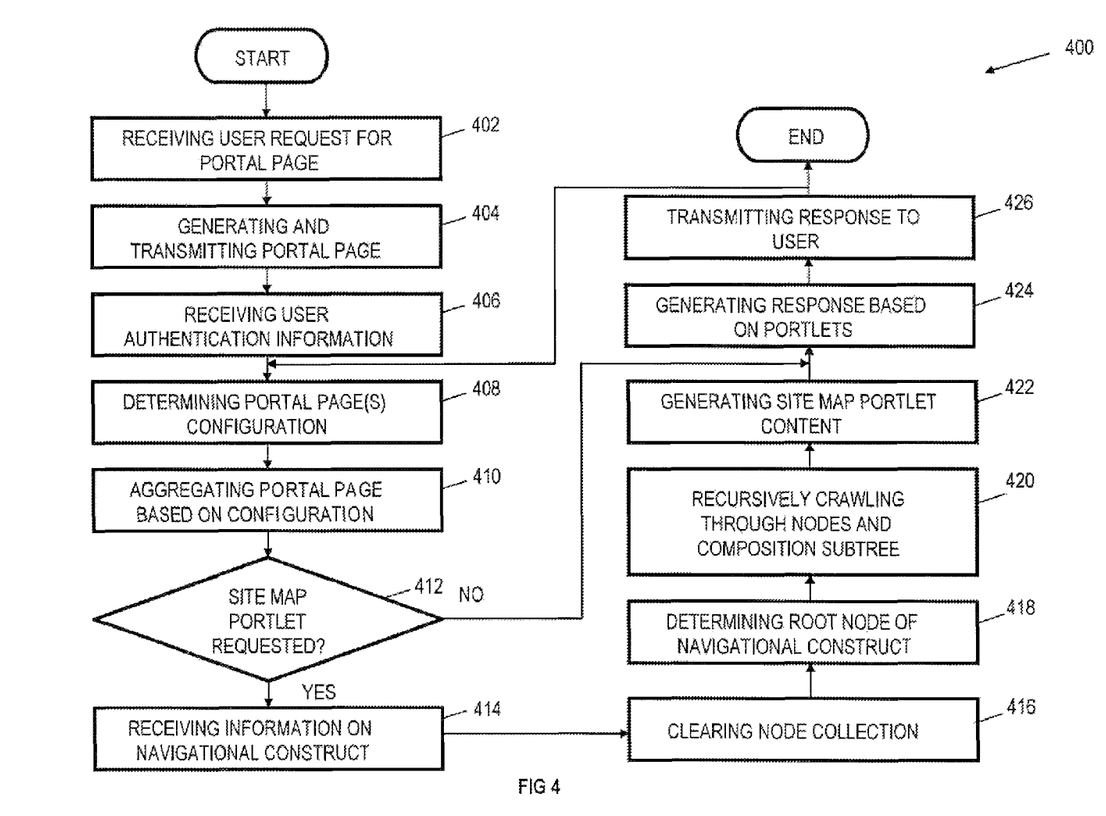
FIG. 4 depicts an example of a flow chart for generating a portal page and a portal site map according to one embodiment.

FIG. 4 depicts an example of a flow chart for generating a portal page and a portal site map according to one embodiment. In one embodiment, components of a portal server 106 such as a dynamic site map portlet 120 may perform the elements of flow chart 400. In the depicted embodiment, flow chart 400 begins with element 402, where a portal server 106 may receive (via the communications module 302) a user request for a portal page, such as when a user selects or otherwise accesses the portal page with their browser 112. At element 404, the session manager 114 may then generate a portal page which the communications module 302 transmits to the user's browser 112 via network 104. The portal page generated at element 404 may be a generic portal page that provides a mechanism for a portal user to enter authentication information, such as a user identifier (ID) and password. Login information and user preferences may optionally be stored as a cookie on the client computer system 102 so that information and preferences do not need to be reentered each time the user accesses the portal. When the user has a cookie on their client computer system 102, the portal server 106 accesses this cookie and adjusts the information or content later sent to the user for display.

After initiating a user portal session by authenticating a portal user, the portal page aggregator 116 of the portal server 106 may, at element 408, determine the portal configuration for the user's portal session, including the number of pages for the portal and the configuration of each of those pages. The configuration of each portal page may include the identity and location of portlets on each portal page. The particular portlets for display (as well as their location on a portal page) may be determined by an administrator, determined by user preference, default portlets, or any combination of these or other factors. For example, the portal page aggregator 116 may determine that, for a particular portal user session, two portal pages are required, with one page having five portlets specified by an administrator and the second page having four portlets chosen by the user out of a list of ten portlets (and specified in their preferences). In this example, the portal page aggregator 116 may also determine that a third page is unsuitable for the user as they do not have the proper rights or permissions. While one example is described herein, the portal page aggregator 116 may use any methodology to determine the portal configuration. After determining the configuration of the portal, the portal page aggregator 116 may aggregate the contents of the portal page based on the determined configuration at element 410. To aggregate the portal page contents, the portal page aggregator 116 may, in conjunction with the portlet applications 118, acquire content from one or more backend applications 122 to be used in creating the portal page.

If a site map portlet is determined to be part of the aggregated portal page at decision block 412 (such as if a user or administrator specified the portlet), the method of flow chart 400 continues to element 414. If the site map portlet is not part of the portal page, the method of flow chart continues to element 424, where the portal page aggregator 116 uses the aggregated content for the items in the portal configuration to generate a portal response. The portal response may be a portal page description (in HTML or other descriptive language) that includes the contributions of each portlet, the final portal page configuration, etc. The communications module 302 may next, at element 426, transmit the generated response to the user on a client computer system 102 for display on their browser, after which flow chart 400 either terminates or returns to element 408 for further cycles of portal page construction and response generation.

When a site map portlet has been requested, the dynamic site map portlet 120 may receive information on the navigational construct of the portal at element 414. The navigational construct of a portal may include a plurality of nodes, where each node is an element in the navigational hierarchy and has a parent and one or more children. After receiving the information on the navigational construct, the dynamic site map portlet 120 may, at element 416, clear the node collection in the node collector 308 if there are any items in the node collection. The node collection may be a file or other data structure that include a list of nodes in the navigational construct as well as information about those nodes, providing a mechanism to store information about portlet pages and their contents. The node collection may have information within it from previous executions of the elements of flow chart 400 and clearing such information may provide a more accurate portal site map. At element 416, the dynamic site map portlet 120 may determine the root node of the navigation construct, such as by analyzing the information on the navigational construct received at element 414. The root node has no parent node and is instead above each other node in the navigational hierarchy. Once the root node has been determined, an indication of the root node may be stored in the node collection of the node collector 308.

Once the root node of a navigational construct is known, the navigation node crawler 306 of the dynamic site map portlet 120 may recursively crawl through all of the nodes beneath the root node (and the composition subtree for each, if applicable) to determine the contents of each node (page), including any portlet information. As each node represents a page of the portal site, the composition subtree (also known as a navigation tree) beneath a node represents the arrangement of portlets on the page represented by that node. The composition subtree may be a programmatic description of the portlets of a page and their arrangement on the page (i.e., size, which column, location, etc.). The navigation node crawler 306 may determine information about each portlet, including a title, description, links within the portlet, or the like. The navigation, node crawler 306 may thus crawl through each node of the portal site at element 420. The recursive crawl of the navigation node crawler 306 through the nodes and their composition subtrees is described in more detail in relation to FIG. 5.

After the recursive crawl through the nodes is complete, the method of flow chart 400 may continue to element 422, where the dynamic site map portlet 120 generates the content for the site map portlet. The displayed content of the site map portlet may include a textual or graphical view of the site map. The user may, in some embodiments, have the option to toggle between the textual and graphical views, zoom in or out of a graphical view, or change the view by panning left, right, up or down. The user may also be able to specify the level of pages to show (i.e., expanding or compressing branches) or control the types of pages to show. The dynamic site map portlet 120 may modify the site map display as necessary to respond to user preferences. The dynamic site map portlet 120 may also add links to provide direct navigation to the pages from the site map, allowing users to quickly and efficiently change their view to a desired page.

Once the site map content has been generated, the content may be added to the generated response at element 424 as the contribution of the site map portlet. The site map portlet may thus be added to the portal page displayed to the portal user, providing the user with a site map of the portal. The user may be able to customize their site map view in some embodiments by choosing the level of fidelity of the map, the appearance of the display, etc. The method of flow chart 400 may then either terminate or return to element 408 for additional processing.

In an alternative embodiment, the methodology of flow chart 400 may also be applied to portals that have portlets with different content or views. Portlets may have different content or views, typically in the form of Java™ Server Pages (JSPs), depending on the user's profile or other factors. The dynamic site map portlet 120 may, in creation of the site map, run a real-time simulation of all possible portlet request-response pairs and then display the outcomes of this simulation as part of the site map view. This feature may ensure that all possible site map nodes will be displayed in the portal site map, including nodes that the user does not see in their portal display. The dynamic site map portlet 120 may accomplish this by simulating different request trough the portlet code to determine all possible logical responses that could be included in the portlet response and, after this is complete, displaying all possible configurations of how the site is organized in the site map. This feature may be particularly useful where a portlet contains steps in a multi-step process, as all of the different branches of the multi-step process may be therefore included in the site map. By querying the number of steps in a multi-step process and interrogating the stage of completion in the process, the disclosed system may not only display all possible states (i.e., views) within the portlet but also identify and display the state of completion for each step (i.e., number and status of each step in a multi-step process) and then display this state completion status within the generated site map.

The disclosed methodology may also prove useful is that it may show users not only what is currently visible on the site map but also what is possible to be shown. For example, the dynamic site map portlet 120 may show both the current organization of the portal site as well as the possibilities of the categorization of hidden additional content that the user may not know is available. When combined with embedded links in the portal site map, a user may quickly access new content. In some embodiments, the nodes and content displayed to the user on the site map may be limited to items for which the user has the appropriate authorization. In a further embodiment, items for which the user may seek the appropriate authorization may also be shown on the site map.

Figure 5:
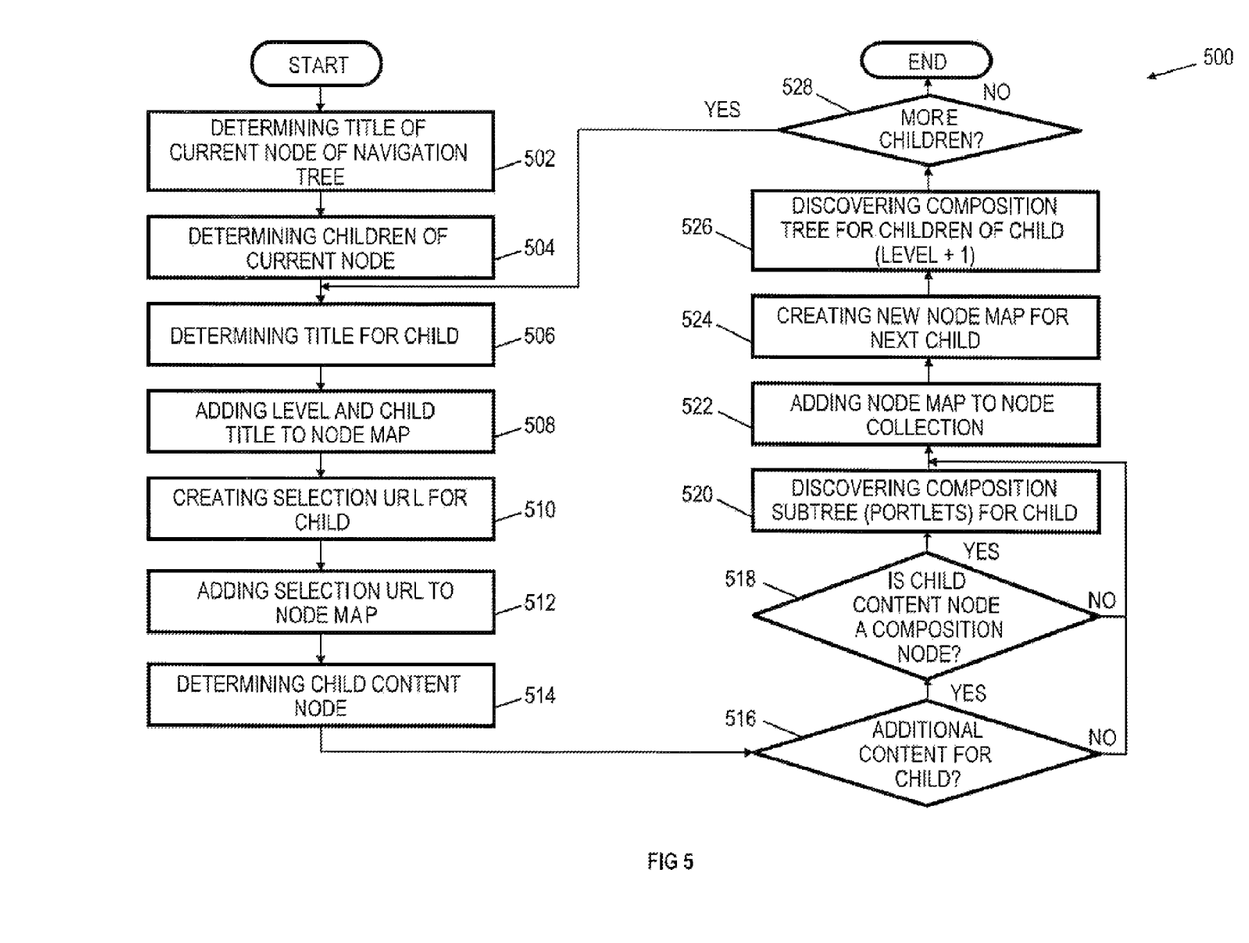
FIG. 5 depicts an example of a flow chart for recursively crawling through navigation nodes and their composition subtrees according to one embodiment.

FIG. 5 depicts an example of a flow chart for recursively crawling through navigation nodes and their composition subtrees according to one embodiment. In one embodiment, the navigation nods crawler 306 of the dynamic site map portlet 120 may perform the elements of flow chart 500 as part of performing element 420 of flow chart 400 of FIG. 4. In the depicted embodiment, flow chart 500 begins with element 502, where the navigation node crawler 306 may determine the title of the current node for the current locale within the navigation tree. At element 504, the navigation node crawler 306 may determine the identity of the children of the current node. As will be described subsequently, elements 506 through 528 may be repeated for each child of the current node for a recursive crawl through all content beneath the current node.

The recursive loop for a particular node may begin at element 506, where the navigation node crawler 306 may determine the title for a child of the current node. After determining the child title, the navigation node crawler 306 may add the child title and the level of the child in the hierarchy to anode map. As the methodology of flow chart 500 is repeated for each child of the current node, each node will be added to the node map. The navigation node crawler 306 may also optionally add a link such as a uniform resource location (URL) to the node map at element 512. A URL link for a child may enhance user functionality of the site map portlet by allowing the user to quickly and easily access the content associated with the child node by selecting the link.

The method of flow chart 500 may continue to element 514, where the navigation node crawler 306 may determine the existence of a content node for the child. The navigation node crawler 306 may determine if the child content node discovered at element 514 includes any content at decision block 516. If the child content node has no content, the method of flow chart 500 continues to element 522. If the child content node has content, flow chart 500 continues to decision block 518, where the navigation node crawler 306 determines whether the child content node is a composition node. If the child content node is not a composition node, flow chart 500 continues to element 522; otherwise, flow chart 500 continues to element 520 where the navigation node crawler 306 discovers the composition subtree for the child. As will be described in more detail in relation to FIG. 6, the navigation node crawler 306 may discover the composition subtree for the child by interrogating each portlet of the node for a description, title, or other information. The navigation node crawler 306 may also add the composition subtree for the child to the node map.

After discovering the composition subtree for a child node (or determining that no content existed for that child node), the navigation node crawler 306 may add the node map to the node collection at element 522. The navigation node crawler 306 may then create a new node map for the next child at element 524. At element 526, the navigation node crawler 306 may discover the composition subtree of the child of the next level (i.e., current level+1). This may allow the navigation node crawler 306 to recursively interrogate any nodes that are children of the current child node and thus to find all nodes beneath the current child node in the hierarchy. At decision block 528, the navigation node crawler 306 may determine if there are more children to analyze. If so, the method of flow chart 500 may return to element 506 for continued processing for the next child. If there are no more children, the method of flow chart 500 may terminate. In one embodiment, processing, may return to flow chart 400 when flow chart 500 terminates.

Figure 6:
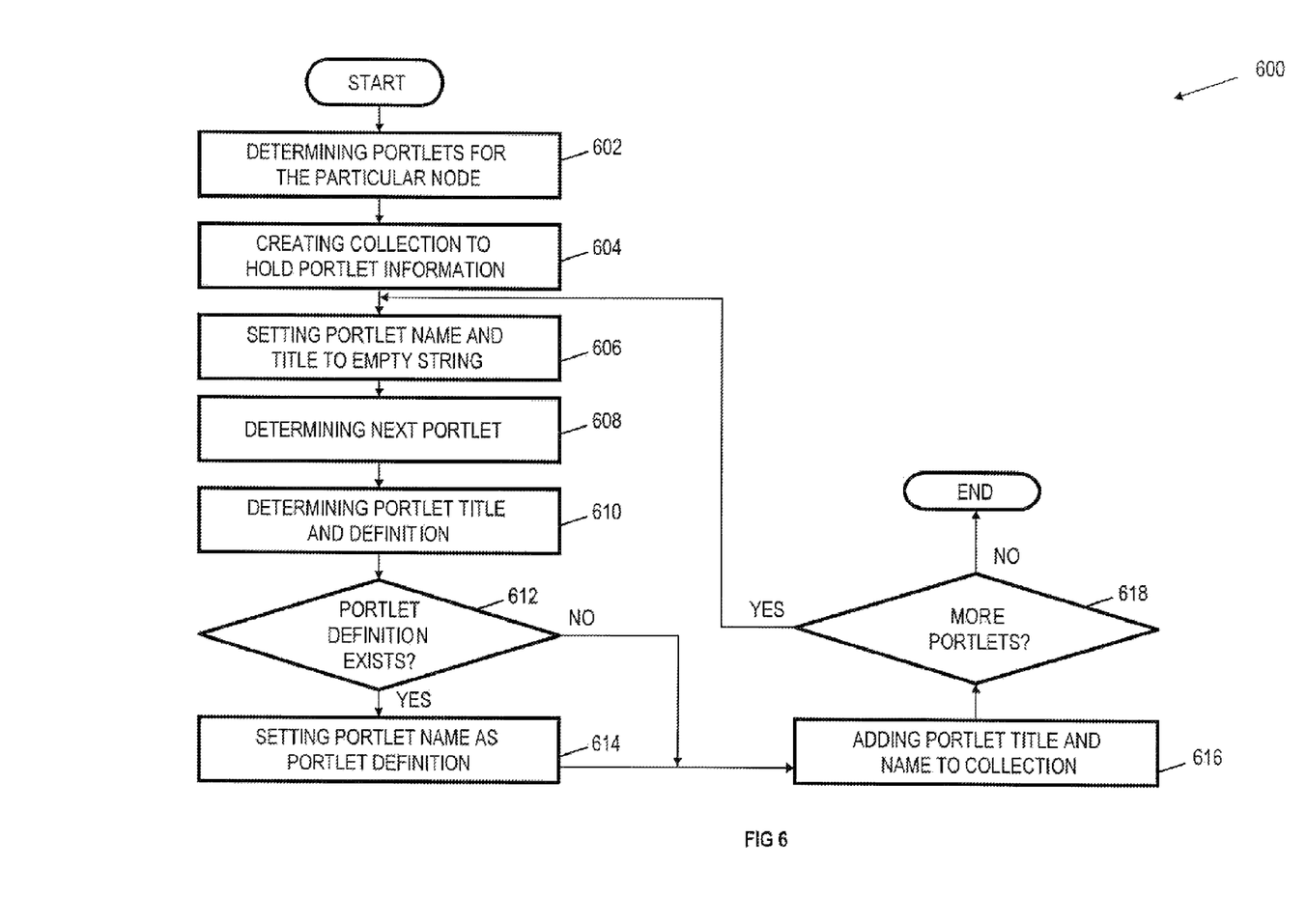
FIG. 6 depicts an example of a flow chart for determining the arrangement and content of portlets on a portal page according to one embodiment.

FIG. 6 depicts an example of a flow chart for determining the arrangement and content of portlets on a portal page according to one embodiment. In one embodiment, the navigation node crawler 306 of the dynamic site map portlet 120 may perform the elements of flow chart 600 as part of performing elements 520 or 526 of flow chart 500 of FIG. 5. As will be described in more detail subsequently, the methodology of FIG. 6 may discover the composition subtree for the child by interrogating each portlet of the node for a description, title, or other information. In the depicted embodiment, flow chart 600 begins with element 602, where the navigation node crawler 306 determines the portlets for the particular node, or page. The navigation node crawler 306 may next create a collection to hold portlet information associated with the node at element 604.

For a particular node, the method of flow chart 600 repeats elements 606 through 618 for each portlet of a node in order to acquire information about each portlet of the node. To begin, the navigation node crawler 306 may set the portlet name and title fields to an empty string at element 606. The navigation node crawler 306 may then determine the next portlet of the node at element 608 and determine the portlet title and portlet definition (if available) at element 610, such as by interrogating the portlet. If a portlet definition for the portlet is available (as determined at decision block 612), the navigation node crawler 306 may set the portlet name as the determined portlet definition at element 614. This may allow the navigation node crawler 306 to utilize the portlet name field to store a portlet definition. The navigation node crawler 306 may adding the portlet title and name to the collection at element 616. The collection may be returned to the calling function (flow chart 500) as part of the results of the method of FIG. 6. The navigation node crawler 306 may then determine at decision block 618 whether more portlets need be interrogated. If all of the portlets have been interrogated, the method of flow chart 600 terminates and the collection may be passed to the calling function. If more portlets exist for the node, flow chart 600 returns to element 606 for interrogation of the next portlet. The portlet name and definition for this portlet may also be added to the collection for later use.

Figure 7:
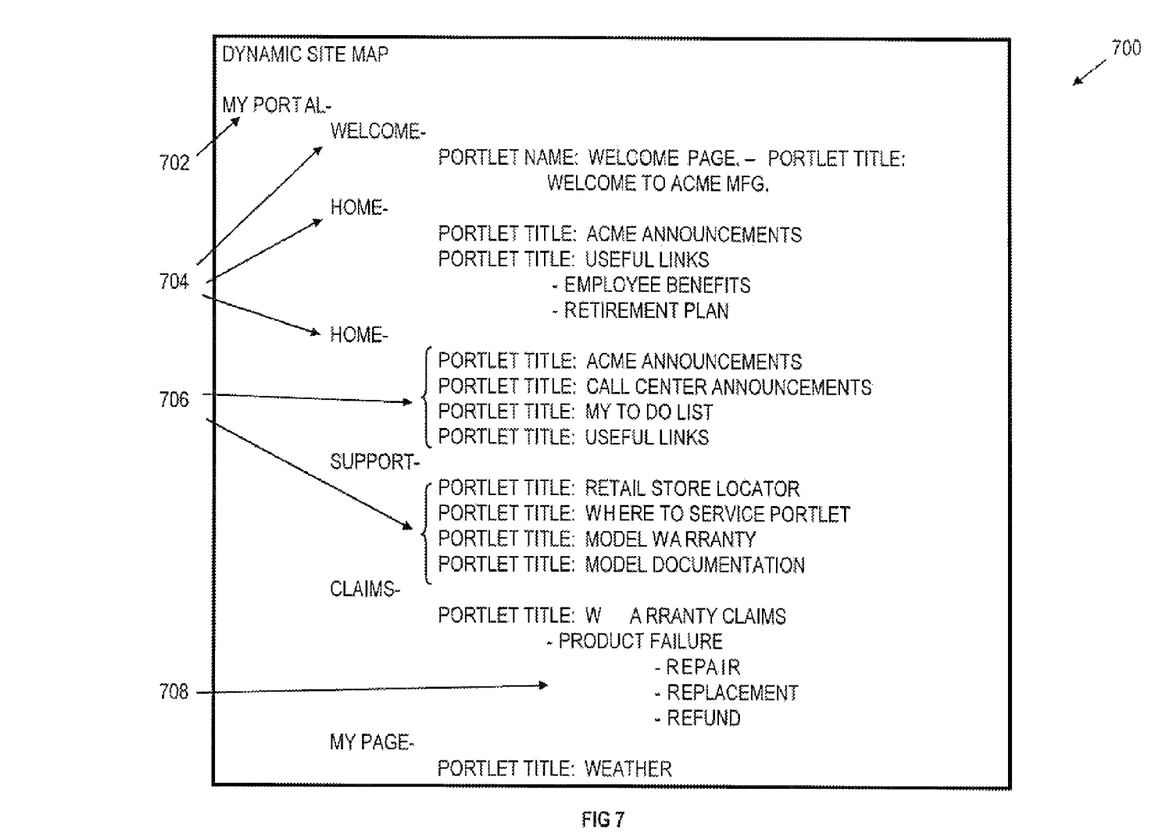
FIG. 7 depicts an example of a generated dynamic portal site map according to one embodiment.

FIG. 7 depicts an example of a generated dynamic portal site map according to one embodiment. The portal site map 700 may result from the execution of elements of flow chart 400 of FIG. 4, such as element 422, by the dynamic site map portlet 120. The generated portal site map 700 may include a portal title 702 and one or more portal pages 704. In one embodiment, different versions of a portal page 704 may exist depending on a user's authorizations, roles and responsibilities, preferences, etc. For example, portal site map 700 includes two different portal pages 704 with the title 'HOME'. In this example, one portal page 704 may be a generic home page for all employees of a corporate portal while another might be specific to call center employees. In some embodiments, portal users will only see portal pages 704 for which they have authorization on their portal site map 700.

Each portal page 704 of the portal site map 700 may have one or more associated portlets 706. In some embodiments, all possible portlets 706 for a portal page 704 are displayed, while in other embodiments only authorized portlets 706 are shown. The portlets 706 may also have an embedded link in some embodiments so that a portal user may easily find the content associated with that portlet 706 on the portal site map 700. In an alternative embodiment, the portal site map 700 may also include multi-state portlets 708, including all possible states of the multi-state portlets 708. One skilled in the art will recognize that the portal site map 700 may have any configuration or design and may include any type of information relating to the portal.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for dynamically generating a portal site map. It is understood that the form of the invention shown and described in the detailed description and the drawings are to be taken merely as examples. It is intended that the following claims be interpreted broadly to embrace all the variations of the example embodiments disclosed.

What is claimed is:

1. A method for generating a site map for a portal site, the method comprising:
   clearing a node collection;
   determining, subsequent to the clearing, a root node of a navigational construct of the portal site, the root node having one or more child nodes, the portal site being configured with a subset of a set of portlets available at the portal site, a portlet in the subset occupying a designated location on the portal site, the subset and the location being selected differently for different users of the portal site;
   recursively crawling through the one or more child nodes of the root node to discover a composition subtree for at least one of the child nodes, the composition subtree comprising information relating to one or more portlets associated with at least one of the child nodes; and
   generating a portal site map, the portal site map comprising an indication of the one or more child nodes and an indication of the one or more portlets associated with at least one of the child nodes, wherein the generated portal site map is different for the different users of the portal site.

2. The method of claim 1, further comprising generating a portlet response based on the generated portal site map.

3. The method of claim 1, wherein determining the root node of the navigational construct comprises receiving information on the navigation construct of the portal site.

4. The method of claim 1, wherein recursively crawling through the one or more child nodes of the root node to discover a composition subtree for at least one of the child nodes comprises discovering the composition subtree for each child node of the portal site.

5. The method of claim 1, wherein recursively crawling through the one or more child nodes of the root node to discover a composition subtree for at least one of the child nodes comprises:
   determining a title for a child node;
   adding the title to a node map; and
   in the event the child node is a composition node, discovering portlets of a composition subtree for the child node and adding information relating to the portlets to the node map.

6. The method of claim 1, wherein generating the portal site map comprises adding one or more links to the portal site map.

7. The method of claim 1, wherein generating the portal site map comprises generating the portal site map based on input received from a portal user.

8. A computer program product for generating a site map for a portal site, the computer program product comprising:
   one or more computer-readable, tangible storage devices;
   program instructions stored on at least one of the one or more storage devices, to clear a node collection;
   program instructions stored on at least one of the one or more storage devices, to determine, subsequent to performing the program instructions to clear the node collection, a root node of a navigational construct of the portal site, the root node having one or more child nodes, the portal site being configured with a subset of a set of portlets available at the portal site, a portlet in the subset occupying a designated location on the portal site, the subset and the location being selected differently for different users of the portal site;
   program instructions stored on at least one of the one or more storage devices, to recursively crawl through the one or more child nodes of the root node to discover a composition subtree for at least one of the child nodes, the composition subtree comprising information relating to one or more portlets associated with at least one of the child nodes; and
   program instructions stored on at least one of the one or more storage devices, to generate a portal site map, the portal site map comprising an indication of the one or more child nodes and an indication of the one or more portlets associated with at least one of the child nodes, wherein the generated portal site map is different for the different users of the portal site.

9. The computer program product of claim 8, further comprising program instructions stored on at least one of the one or more storage devices, to generate a portlet response based on the generated portal site map.

10. The computer program product of claim 8, wherein the program instructions to determine the root node of the navigational construct receive information on the navigation construct of the portal site.

11. The computer program product of claim 8, wherein the program instructions to recursively crawl through the one or more child nodes of the root node to discover a composition subtree for at least one of the child nodes discover the composition subtree for each child node of the portal site.

12. The computer program product of claim 8, wherein the program instructions to recursively crawl through the one or more child nodes of the root node to discover a composition subtree for at least one of the child nodes:
   determine a title for a child node;
   add the title to a node map; and
   in the event the child node is a composition node, discover portlets of a composition subtree for the child node and adding information relating to the portlets to the node map.

13. The computer program product of claim 8, wherein the program instructions to generate the portal site map add one or more links to the portal site map.

14. The computer program product of claim 8, wherein the program instructions to generate the portal site map generate the portal site map based on input received from a portal user.

15. A computer system for generating a site map for a portal site, the system comprising:
   one or more processors, one or more computer-readable memories and one or more computer-readable, tangible storage devices;
   program instructions, stored on at least one of the one or more storage devices for execution by at least one of the one or more processors via at least one of the one or more memories, to clear a node collection;
   program instructions, stored on at least one of the one or more storage devices for execution by at least one of the one or more processors via at least one of the one or more memories, to determine, subsequent to performing the program instructions to clear the node collection, a root node of a navigational construct of the portal site, the root node having one or more child nodes, the portal site being configured with a subset of a set of portlets available at the portal site, a portlet in the subset occupying a designated location on the portal site, the subset and the location being selected differently for different users of the portal site;
   program instructions, stored on at least one of the one or more storage devices for execution by at least one of the one or more processors via at least one of the one or more memories, to recursively crawl through the one or more child nodes of the root node to discover a composition subtree for at least one of the child nodes, the composition subtree comprising information relating to one or more portlets associated with at least one of the child nodes; and
   program instructions, stored on at least one of the one or more storage devices for execution by at least one of the one or more processors via at least one of the one or more memories, to generate a portal site map, the portal site map comprising an indication of the one or more child nodes and an indication of the one or more portlets associated with at least one of the child nodes, wherein the generated portal site map is different for the different users of the portal site.

16. The system of claim 15, further comprising program instructions, stored on at least one of the one or more storage devices for execution by at least one of the one or more processors via at least one of the one or more memories, to generate a portlet response based on the generated portal site map.

17. The system of claim 15, wherein the program instructions to recursively crawl through the one or more child nodes of the root node to discover a composition subtree for at least one of the child nodes:
   determine a title for a child node;
   add the title to a node map; and
   in the event the child node is a composition node, discover portlets of a composition subtree for the child node and adding information relating to the portlets to the node map.

18. The system of claim 15, wherein the program instructions to generate the portal site map add one or more links to the portal site map.

19. A computer program product comprising one or more computer-readable, tangible storage devices and computer-readable program instructions which are stored on the one or more storage devices and when executed by one or more processors, perform the method of claim 1.

20. A computer system comprising one or more processors, one or more computer-readable memories, one or more computer-readable, tangible storage devices and program instructions which are stored on the one or more storage devices for execution by the one or more processors via the one or more memories and when executed by the one or more processors perform the method of claim 1.

* * * * *